United States Patent
Burke et al.

(10) Patent No.: US 10,697,503 B1
(45) Date of Patent: Jun. 30, 2020

(54) SWITCHABLE CLUTCH WITH ONE-WAY AND FULLY LOCK MODES

(71) Applicant: SCHAEFFLER TECHNOLOGIES AG & CO. KG, Herzogenaurach (DE)

(72) Inventors: Peter Burke, Charlotte, NC (US); Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/211,951

(22) Filed: Dec. 6, 2018

(51) Int. Cl.
F16D 41/12 (2006.01)
F16D 41/04 (2006.01)
F16D 41/08 (2006.01)

(52) U.S. Cl.
CPC ............. *F16D 41/12* (2013.01); *F16D 41/04* (2013.01); *F16D 41/084* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,246,094 A * | 9/1993 | Army | ................ | F02N 15/027 192/104 C |
| 8,042,670 B2 * | 10/2011 | Bartos | ................ | F16D 41/16 192/43.1 |
| 8,540,065 B2 * | 9/2013 | Samie | ................ | F16D 41/084 188/82.2 |
| 10,006,507 B2 * | 6/2018 | Lee | ................ | F16D 41/12 |
| 2004/0238306 A1 * | 12/2004 | Reed | ................ | F16D 41/16 192/43.1 |
| 2007/0278061 A1 * | 12/2007 | Wittkopp | ................ | F16D 41/16 192/43.1 |
| 2009/0266667 A1 * | 10/2009 | Samie | ................ | F16D 41/12 192/43.1 |
| 2010/0252384 A1 * | 10/2010 | Eisengruber | ................ | F16D 41/125 192/35 |
| 2011/0290608 A1 | 12/2011 | Bird et al. | | |
| 2012/0103745 A1 | 5/2012 | Bird | | |

* cited by examiner

*Primary Examiner* — Ernesto A Suarez
*Assistant Examiner* — Ryan P Dodd
(74) *Attorney, Agent, or Firm* — Brooks Kushman P.C.

(57) ABSTRACT

A clutch includes an outer race including pawls each having first and second arms and an inner race including teeth engageable with the pawls. A cage is radially disposed between the inner and outer races and is rotatable relative to the pawls to switch the clutch between a one-way mode and a fully locked mode. The cage includes ramps each configured to urge an associated one of the first arms into engagement with the teeth when the cage is in a first rotational position to put the clutch in the fully locked mode and resilient members each configured to urge an associated one of the second arms into engagement with the teeth when the cage is in a second rotational position to put the clutch in the one-way mode.

20 Claims, 7 Drawing Sheets

US 10,697,503 B1

SWITCHABLE CLUTCH WITH ONE-WAY AND FULLY LOCK MODES

TECHNICAL FIELD

The present disclosure relates to clutches that include a one-way mode and a fully locked mode.

BACKGROUND

Motor vehicles include rotatable components that require coupling during certain conditions. A clutch is one device used to selectively couple one or more rotating component to each other or to couple a rotating component to a fixed component such as a housing. The clutch may include an inner race fixed with one of the components and an outer race fixed to the other of the components. The clutch includes mechanisms engageable between the inner and outer races to restrain rotation of the races in one or both directions depending upon the type of clutch. One-way clutches couple the rotating members in only a one direction whereas bidirectional clutches couple the rotating members in both directions.

SUMMARY

According to one embodiment, a clutch includes an outer race including pawls each having first and second arms and an inner race including teeth engageable with the pawls. A cage is radially disposed between the inner and outer races and is rotatable relative to the pawls to switch the clutch between a one-way mode and a fully locked mode. The cage includes ramps each configured to urge an associated one of the first arms into engagement with the teeth when the cage is in a first rotational position to put the clutch in the fully locked mode and resilient members each configured to urge an associated one of the second arms into engagement with the teeth when the cage is in a second rotational position to put the clutch in the one-way mode.

According to another embodiment, a clutch includes first and second races supported for concentric rotation. The first race has a pawl having first and second arms independently engageable with the second race. The pawl is pivotal to a first position in which the first arm engages with the second race to lock the first and second races in both directions of rotation and to a second position in which the second arm engages with the second race to lock the first and second races in only one of the directions of rotation. An annular cage is radially disposed between the first and second races and is rotatable relative to the first race to move the pawl between the first and second positions.

According to yet another embodiment, a clutch is selectable between a one-way mode and a fully locked mode. The clutch includes first and second races supported for concentric rotation. The first race includes circumferentially arranged pawls each having first and second arms of unequal length. The pawls are pivotal to engage either the first arm or the second arm with the second race. An annular cage is radially disposed between the first and second races and is rotatable relative to the first race to actuate the clutch between the one-way mode in which the second arms are engaged with the second race and the fully locked mode in which the first arms are engaged with the second race.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
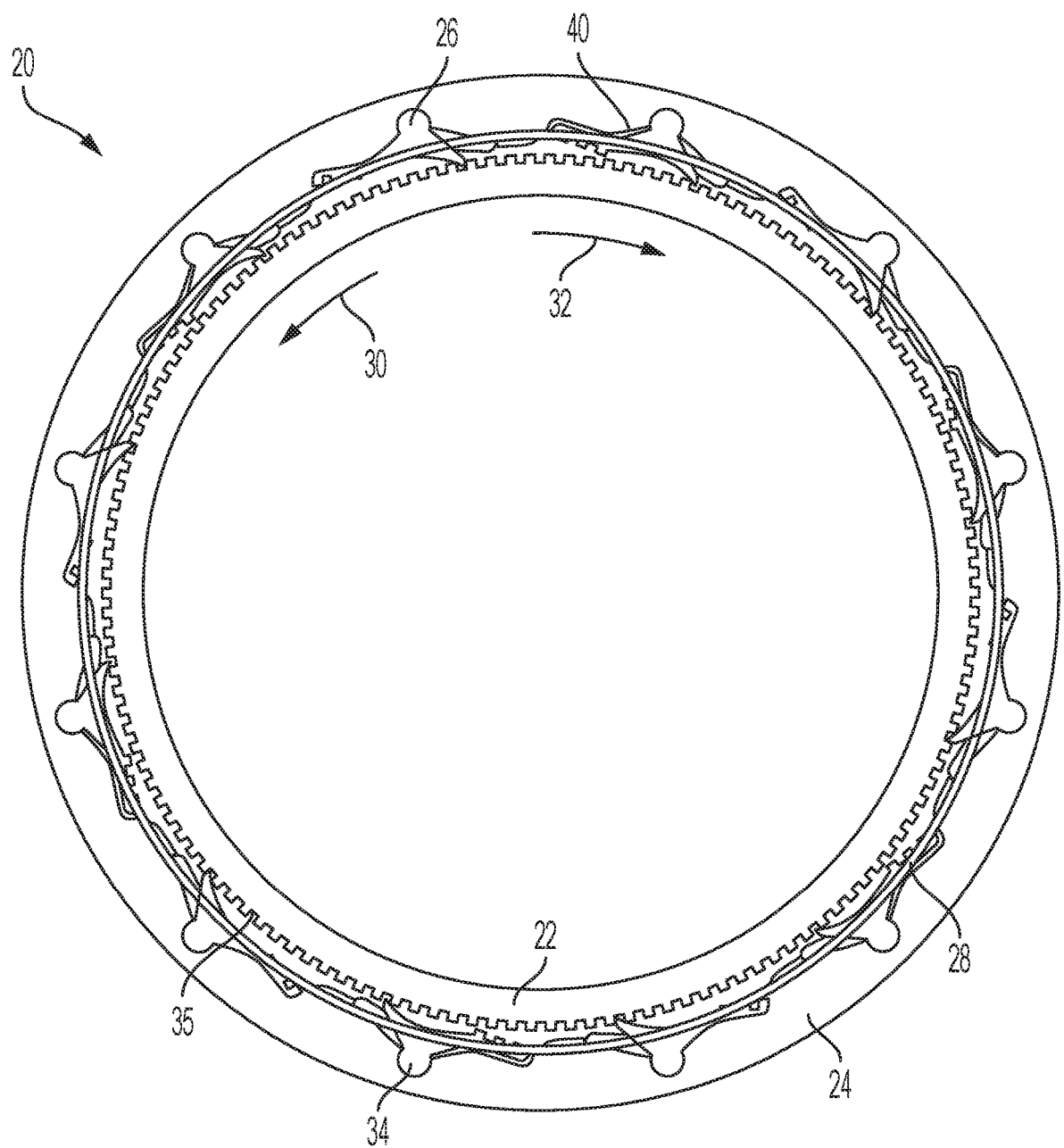
FIG. 1 is a front view of a clutch according to one embodiment.

Referring to FIG. 1, a clutch 20 includes an inner race 22 connectable to a first component and an outer race 24 connectable to a second component. The inner and outer races 22, 24 are supported for concentric rotation about a common axis. The first and second components may be rotatable components that are selectively coupled for synchronized rotation via the clutch 20. Alternatively, one of the first and second components may be a fixed component, such as a housing, and the clutch 20 selectively grounds the rotatable component to the fixed component when engaged (this type of clutch is commonly referred to as a brake). The clutch 20 may be used in vehicle applications such as within an automatic transmission or as part of the vehicle powertrain.

Figure 8:
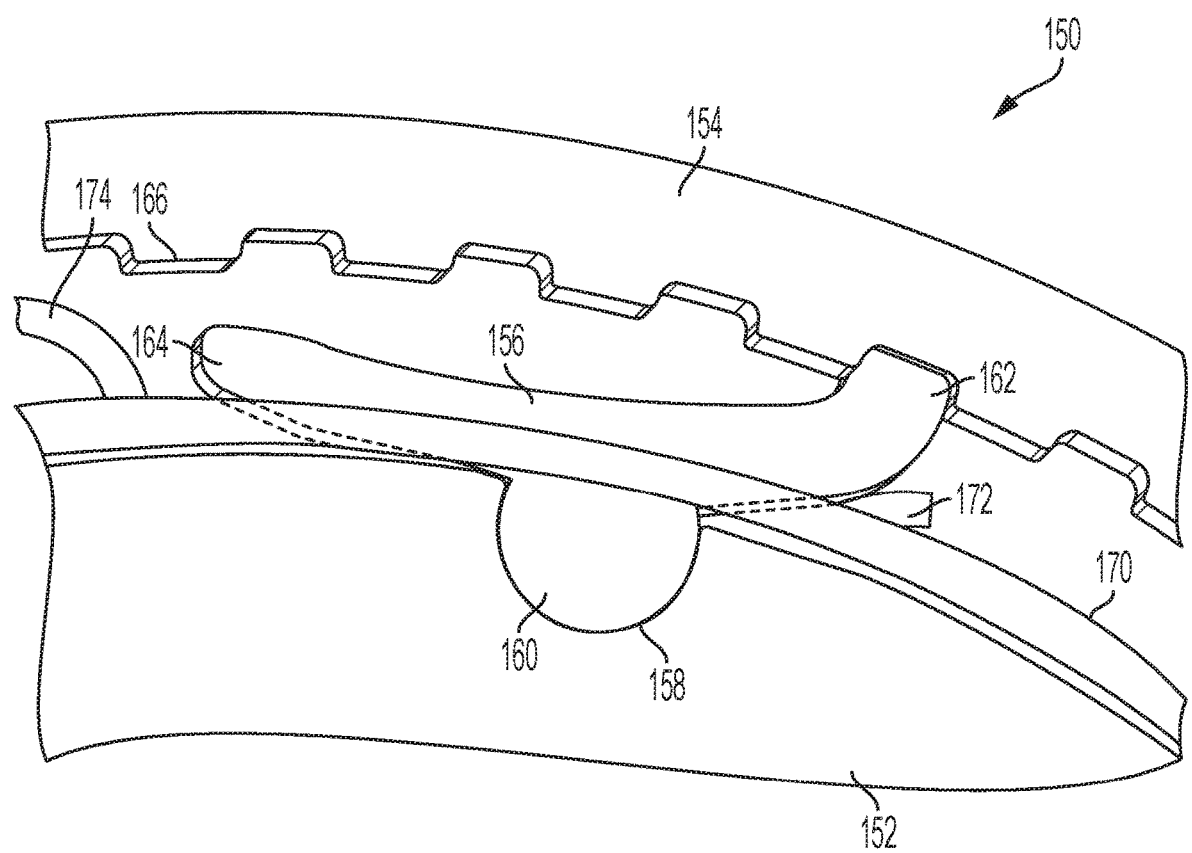
FIG. 8 is a zoomed-in front view of a clutch according to yet another embodiment.

The clutch 20 is a ratchet-style clutch that includes pawls 26 (sometimes referred to as struts) circumferentially arranged between the inner and outer races 22, 24. The pawls 26 cooperate to resist relative rotation between the inner and outer races 22, 24 in a first rotational direction 30 when the clutch is in a one-way mode, and cooperate to resist relative rotation between the inner and outer races 22, 24 in both the first direction 30 and a second direction 32 when the clutch is in a fully locked mode, i.e. bidirectionally locked. The pawls 26 may be pivotally anchored to the outer race 24 as shown in FIG. 1 or may be pivotally anchored to the inner race as shown in FIG. 8. The pawls 26 engage with teeth 35 formed on the outer diameter of the inner race 22. The clutch 20 is switched between the one-way mode and the fully locked mode by pivoting the pawls 26 between different positions. The pawls 26 may be actuated by a cage 28 that is radially disposed between the inner race 22 and the outer race 24. The cage 28 is rotated relative to the outer race 24 to pivot the pawls 26. This will be explained in more detail below.

Figure 2:
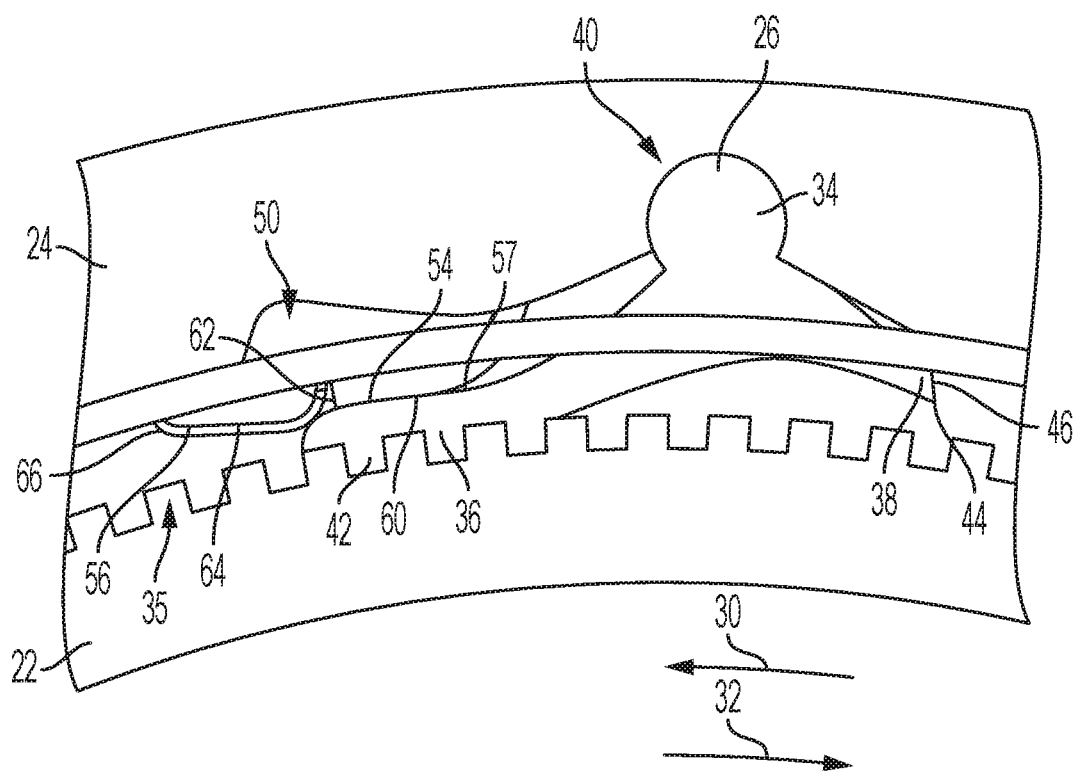
FIG. 2 is a zoomed-in front view of the clutch in a fully locked mode.

Referring to FIG. 2, each of the pawls 26 may include a generally cylindrical lobe 34, a first arm 36 extending circumferentially from one side of the lobe, and a second arm 38 extending circumferentially from the other side of the lobe. The arms may be of unequal length with the first arm 36 being longer than the second arm 38. The pawls 26 are attached to the outer race 24 by inserting the lobes 34 into pockets 40 defined in the outer race 24. The lobes 34 can pivot within the pockets 40 so that the pawls 26 are movable between at least a first position in which the first arms 36 engage with the teeth 35 and a second position in which the second arms 38 engage with the teeth 35. The outer race 24 also defines recesses 50 shaped to receive the first arms 36 and the second arms 38 when the pawls 26 are pivoted.

The clutch 20 is in the fully locked mode when the first arms 36 are engaged with the teeth 35 and is in the one-way mode when the second arms 38 are engaged with the teeth 35. The first arms 36 may each include teeth 42 configured to mesh with the teeth 35. The second arms 38 may each include a single tooth 44 configured to engage with the teeth 35. The teeth 42 are configured to remain engaged with the inner race 24 when the inner race rotates in both the first direction 30 and the second direction 32 to fully lock the clutch. In contrast, the tooth 44 includes a face 46 configured to engage with the inner race 22 when it rotates in the first direction 30, and the tooth 44 is configured to ride over the teeth 35 allowing the inner race 22 to freewheel in the second direction 32 to lock the clutch 20 in only one direction.

Figure 4:
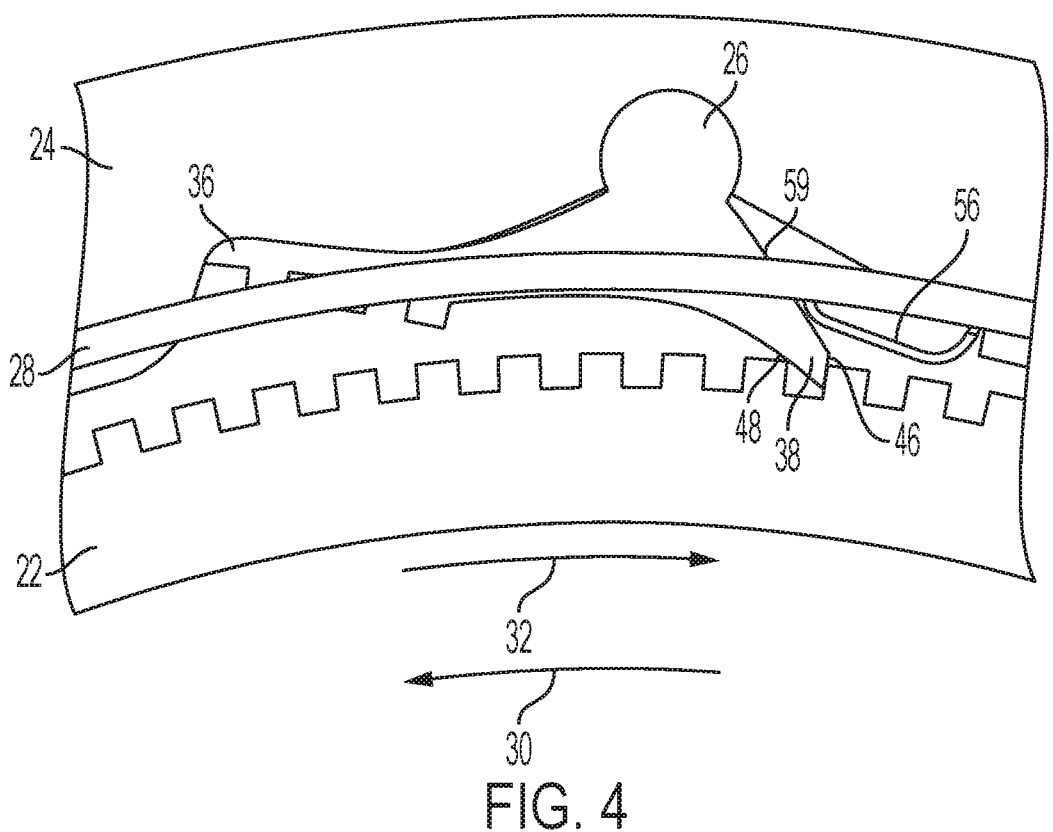
FIG. 4 is a zoomed-in front view of the clutch in a one-way mode.
Figure 3:
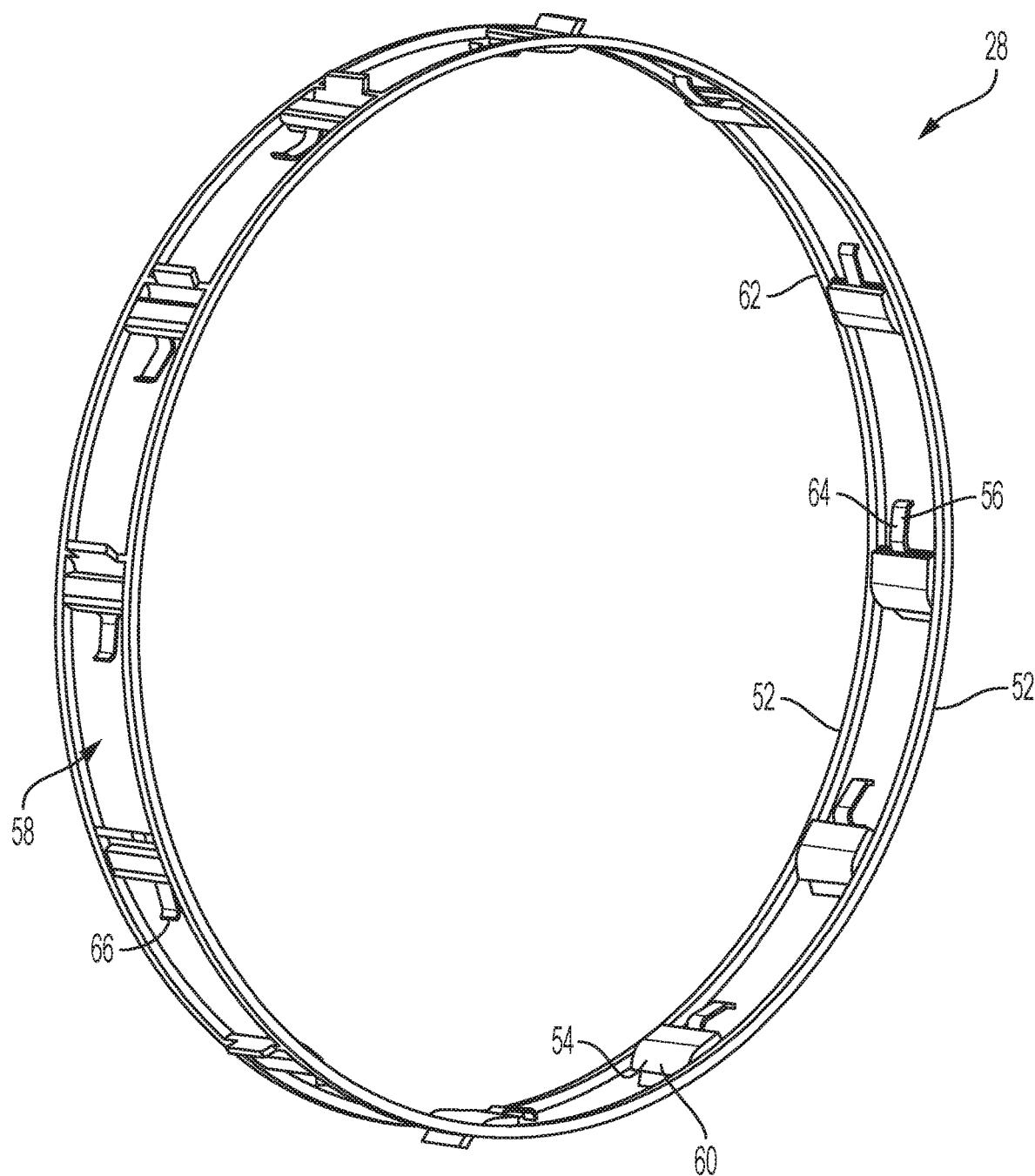
FIG. 3 is a perspective view of a cage of the clutch.

Referring to FIGS. 2, 3, and 4, the cage 28 rotates the pawls 26 between the first position in which the first arms 36 are engaged with the teeth 35 and a second position in which the second arms 38 are engaged with the teeth. The clutch 20 is in the fully locked mode when the pawls 26 are in their first position and is in the one-way mode when the pawls 26 are in their second position.

The cage 28 is annular and includes a pair of axially spaced side rings 52 that are interconnected to be fixed relative to each other. The side rings 52 are spaced so that the pawls 26 fit between the side rings 52. A plurality of ramps 54 are circumferentially arranged around the cage 28 and include a first axial side attached to one of the side rings 52 and a second axial side connected to the other of the side rings 52. Each of the ramps 54 slopes radially inward and includes a wedging surface 60 and an end face 62. Each of the ramps 54 is paired with a resilient member 56 that is attached to a backside of the ramp 54 and extends circumferentially from the end face 62. The resilient member 56 may be a spring. Each of the resilient members 56 may include an engaging surface 64 and a hooked end 66. The resilient members 56 may be a separate component attached to the cage 28 or an integrally formed portion of the cage 28. The ramp/resilient-member pairs cooperate with the side rings 52 to define openings 58 that receives the pawls 26. The ramp/resilient-member pairs are circumferentially spaced from each other by a distance that is greater than the circumferential length of the pawls 26 so that the pawls fit therebetween and so that only one of the arms of each pawl is contacted by the cage 28 at a time. The number of ramps, resilient members, and pawls may be equal. In the illustrated embodiment of FIG. 1, the clutch 20 includes 12 pawls, 12 ramps, and 12 resilient members. In other embodiments, however, the number of pawls, ramps, and resilient members may be increased or decreased depending upon the size of the clutch, strength requirements, and other considerations.

The cage 28 not only actuates the pawls 26 between the first and second positions but also holds the arms against the inner race to maintain the clutch 20 in an engagement state. The ramps 54 are configured to hold the first arms 36 in contact with the inner race 22, and the resilient members 56 are configured to hold the second arms 38 contact with the inner race 22. Rotating the cage 28 in the second direction 32 engages the wedging surfaces 60 of the ramps 54 with backsides 57 of the first arms 36 to pivot the pawls 26 to the first position in which the teeth 42 of the first arms 36 mesh with the teeth 35 to fully lock the clutch (see FIG. 2). The ramps 54 and the arms 36 may include sloping features that facilitate the ramps 54 riding over the first arms 36. The ramps 54 are rigid with respect to the cage 28 to maintain mesh between the teeth 42 and the teeth 35.

The clutch 20 is actuated from the fully locked mode to the one-way mode by rotating the cage 28 in the first direction 30 as shown in FIG. 4. Rotating the cage 28 in the first direction 30 releases the ramps 54 from the first arms 36 and engages the resilient members 56 with the second arms 38 to rotate the pawls 26 to the second positions in which the second arms 38 engage with the inner race 22. The hooked ends 66 of the resilient members provide a ramp to ride on top of the second arms 38 facilitating pivoting of the pawls 26. When the cage 28 is fully rotated, engaging surfaces 64 of the resilient members 56 are disposed against the backsides 59 of the second arms 38 to urge the teeth 44 into engagement with the teeth 35. The faces 46 of the teeth 44 are designed to engage with the teeth 35 to prevent the inner race 22 from rotating in the first direction 30. The resilient members 56 have sufficient spring force to maintain the interlock between the second arms 38 and the teeth 35. The second arms 38 have a sloped inner surface 48 that is configured to ride over the teeth 35 to disengage the second arms 38 from the inner race 22 so that the inner race 22 can freewheel in the second direction 32. During freewheeling, the resilient members 56 are radially deflectable allowing the second arms 38 to ride over the teeth 35.

The clutch 20 includes an actuator (not shown) that rotates the cage 28 to switch the clutch between the various modes of operation. The actuator may be hydraulic, pneumatic, mechanical, or electromagnetic.

Figure 5:
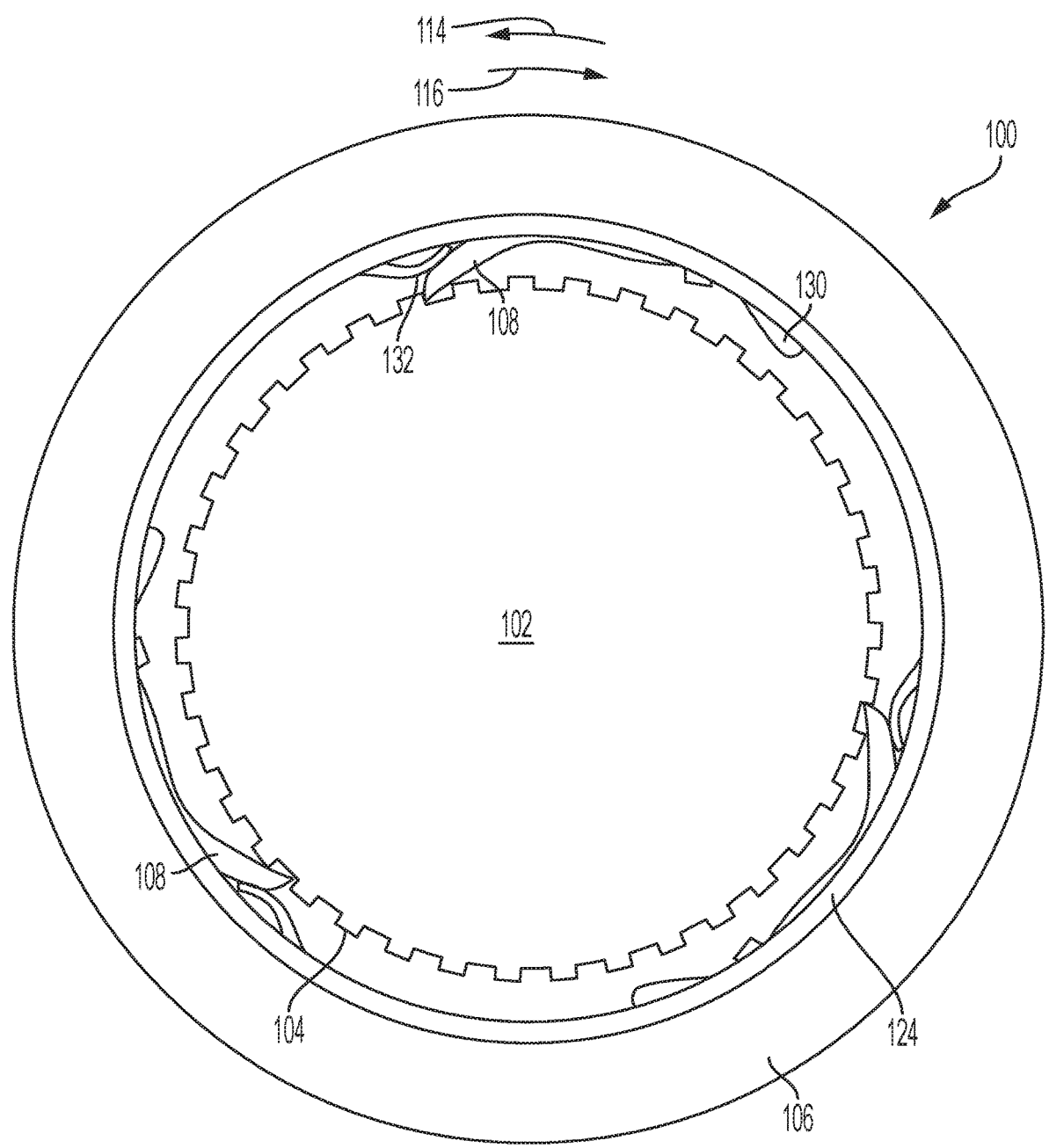
FIG. 5 is front view of a clutch according to another embodiment.
Figure 6:
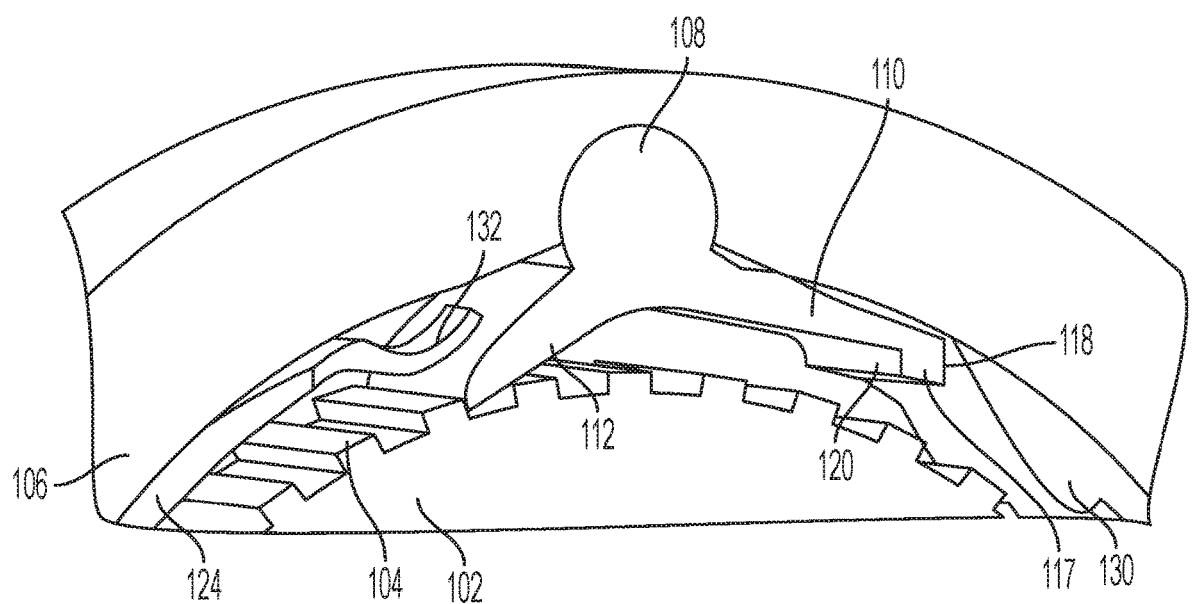
FIG. 6 is a partial back perspective view of the clutch of FIG. 5 in a fully locked mode.
Figure 7:
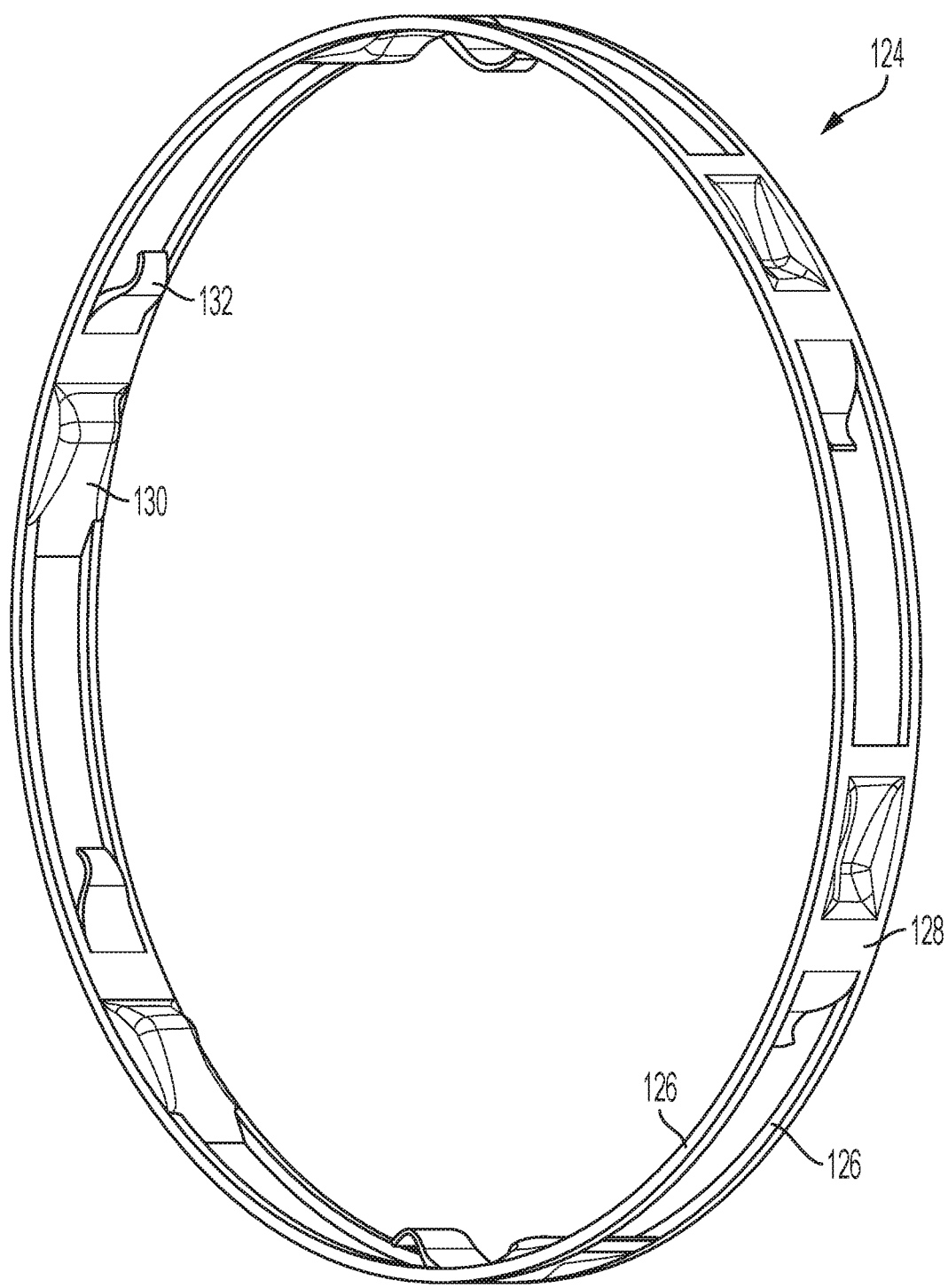
FIG. 7 is a perspective view of a cage of the clutch of FIG. 5.

FIGS. 5, 6 and 7 illustrate a clutch 100 according to another embodiment. The clutch 100 operates similar to the clutch 20 but includes pawls and a cage of different design. The clutch 100 also uses three larger pawls as compared to the 12 smaller pawls of the clutch 20. The clutch 100 includes an inner race 102 defining teeth 104. An outer race 106 circumscribes the inner race 102 and includes a plurality of pawls 108 pivotally attached to the outer race 106. Each of the pawls 108 includes a first arm 110 and a second arm 112. The first arms 110 are configured to bidirectionally lock the inner and outer races 102, 106, and the second arms 112 are configured to lock the inner and outer races in a first direction 114 and allow the inner race 102 to freewheel and a second direction 116. Unlike the clutch 20, the first arms 110 include a single tooth 117 that includes a first face 118 configured to engage with the teeth 104 to prevent rotation of the inner race in the second direction 116 and a second face 120 configured to engage with the teeth 104 to prevent rotation of the inner race in the first direction 114. The second arm 112 is similar to the second arm 38 and only engages the teeth 104 to prevent rotation of the inner race in the first direction 114 while allowing the inner race 102 to freewheel in the second direction 116.

The clutch 100 includes a cage 124 that actuates the pawls 108 between the first and second positions to switch the clutch 100 between the fully locked mode and the one-way mode. The cage 124 is annular and includes a pair of axially spaced side rings 126 that are interconnected by a plurality of axially extending cross members 128. Attached to each cross member 128 is a ramp 130 extending generally circumferentially from the first side of the cross member 128 and a resilient member 132 extending generally circumferentially from the second side of the cross member 128. The resilient member 132 may be a spring that is attached to the cross member 128 or may be an integrally formed portion of the cage 124 as shown in FIG. 7.

Rotating the cage 124 in the first direction 114 engages the resilient members 132 with the second arms 112 to place the clutch 100 in the one-way mode. Rotating the cage 124 in the second direction 116 engages the ramps 130 with the first arms 110 to place the clutch 100 in the fully locked mode.

While clutches 20 and 100 had the pawls attached to the outer race, it is also possible to pivotally attach the pawls to the inner race. FIG. 8 shows a clutch 150 having an inner race 102 and an outer race 106 supported for concentric rotation. Pawls 156 are pivotally attached to the inner race 102. For example, the inner race 102 may define a plurality of pockets 158 that receive the lobes 160 of the pawls 156. Like above, the pawls 156 include a first arm 162 and a second arm 164. The outer race 154 defines internal teeth 166 that are engageable with the pawls 156 to selectively lock the inner and outer races in one or both directions. The first arm 162 is engageable with the teeth 166 to lock the clutch in both directions and the arm 164 is configured to lock the clutch in only one direction. The pawls 156 are actuated by a cage 170 having ramps 172 configured to engage the first arms 162 with the internal teeth 166 to place the clutch in the fully locked mode. The cage 170 also has resilient members 174 configured to urge the second arms 164 into engagement with the teeth 166. The resilient members 174 are deflectable allowing the clutch 150 to freewheel in one direction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 20 clutch
22 inner race
24 outer race
26 pawl
28 cage
30 first direction
32 second direction
34 lobe
35 teeth
36 first arm
38 second arm
40 pocket
42 teeth
44 tooth
46 face
48 inner surface
50 recess
52 side ring
54 ramp
56 resilient member
57 backside
58 opening
59 backside
60 wedging surface
62 end face
64 engaging surface
66 hooked end
100 clutch
102 inner race
104 teeth
106 outer race
108 pawl
110 first arm
112 second arm
114 first direction
116 second direction
117 tooth
118 first face
120 second face
124 cage
126 side ring
128 crossmember
130 ramp
132 resilient member
150 clutch
154 outer race
156 pawl
158 pocket
160 lobe
162 first arm
164 second arm
170 cage
172 ramp
174 resilient member

What is claimed is:

1. A clutch comprising:
   an outer race including pawls each having first and second arms;
   an inner race including teeth engageable with the pawls; and a cage radially disposed between the inner and outer races and rotatable relative to the pawls to switch the clutch between a one-way mode and a fully locked mode, the cage including ramps each configured to urge an associated one of the first arms into engagement with the teeth when the cage is in a first rotational position to put the clutch in the fully locked mode and resilient members each configured to urge an associated one of the second arms into engagement with the teeth when the cage is in a second rotational position to put the clutch in the one-way mode.

2. The clutch of claim 1, wherein the ramps are rigid with respect to the cage and the resilient members are radially deflectable allowing the second arms to slide over the teeth so that the inner race is permitted to freewheel during the one-way mode.

3. The clutch of claim 1, wherein the first arms are longer than the second arms.

4. The clutch of claim 1, wherein the cage is annular.

5. The clutch of claim 1, wherein the outer race defines a plurality of circumferentially arranged pockets, and the pawls each have a lobe that is pivotally received with a corresponding one of the pockets.

6. The clutch of claim 1, wherein the first arms define teeth configured to mesh with the teeth of the inner race.

7. The clutch of claim 1, wherein the resilient members are attached to a backside of the ramps.

8. The clutch of claim 1, wherein the resilient members are an integrally formed portion of the cage.

9. The clutch of claim 1, wherein the cage defines openings and each of the pawls are disposed in one of the openings.

10. A clutch comprising:
first and second races supported for concentric rotation, the first race including a pawl having first and second arms independently engageable with the second race, the pawl being pivotal to a first position in which the first arm engages with the second race to lock the first and second races in both directions of rotation and to a second position in which the second arm engages with the second race to lock the first and second races in only one of the directions of rotation; and
an annular cage radially disposed between the first and second races and rotatable relative to the first race to move the pawl between the first and second positions.

11. The clutch of claim 10, wherein the annular cage includes a ramp and a resilient member circumferential spaced apart to define an opening the receives the pawl therein, wherein rotation of the cage in a first direction engages the ramp with the first arm to rotate the pawl to the first position and rotation of the cage in a second direction engages the resilient member with the second arm to rotate the pawl to the second position.

12. The clutch of claim 11, wherein the ramp and the resilient member are spaced apart by a distance that is larger than a circumferential length of the pawl so that only one of the ramp and the resilient member is engageable with the pawl at a time.

13. The clutch of claim 11, wherein the ramps are rigid with respect to the cage and the resilient members are radially deflectable allowing the second arms to slide over the second race so that the second race is permitted to freewheel in one of the directions of rotation during the one-way mode.

14. The clutch of claim 10, wherein the first race is an outer race and the second race is an inner race.

15. The clutch of claim 10, wherein the first race is an inner race and the second race is an outer race.

16. The clutch of claim 10, wherein the first arm is longer than the second arm.

17. The clutch of claim 10, wherein the second race defines teeth configured to engage with the pawl.

18. A clutch selectable between a one-way mode and a fully locked mode, the clutch comprising:
first and second races supported for concentric rotation, the first race including circumferentially arranged pawls each having first and second arms of unequal length and being pivotal to engage either the first arm or the second arm with the second race; and
an annular cage radially disposed between the first and second races and rotatable relative to the first race to actuate the clutch between the one-way mode in which the second arms are engaged with the second race and the fully locked mode in which the first arms are engaged with the second race.

19. The clutch of claim 18, wherein the cage includes resilient members configured to urge the second arms into engagement with the second race when the clutch is in the one-way mode.

20. The clutch of claim 18, wherein the first race is an outer race and the second race is an inner race.

* * * * *